April 1, 1947.  R. M. STORER  2,418,434
METHOD AND MEANS OF HARVESTING ICE
Filed July 8, 1939   2 Sheets-Sheet 2
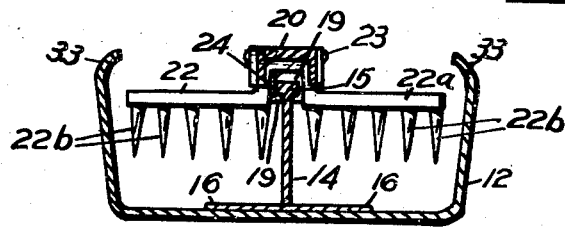
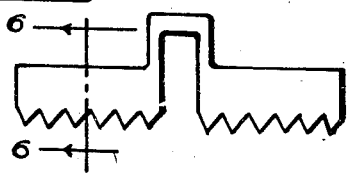
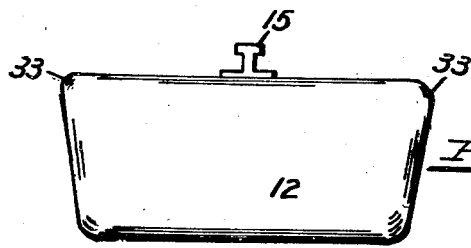
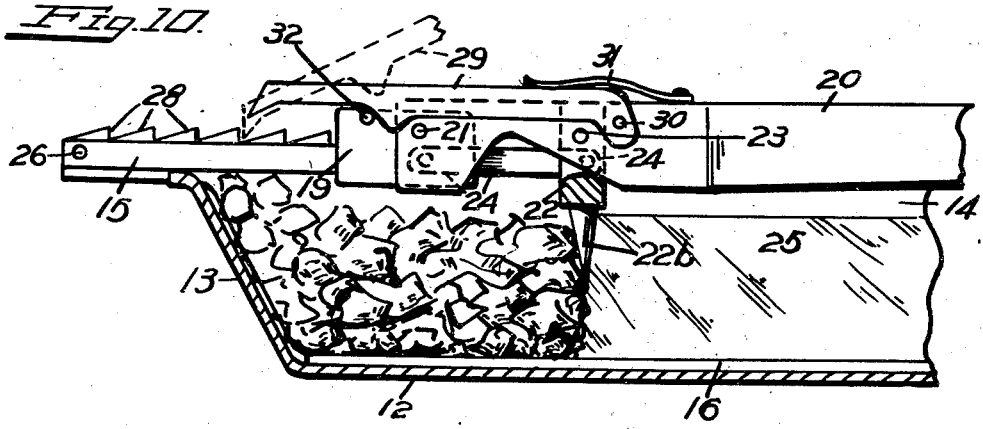
INVENTOR.
RICHARD M. STORER
BY
Rollandet, McGrew & Campbell
ATTORNEYS.

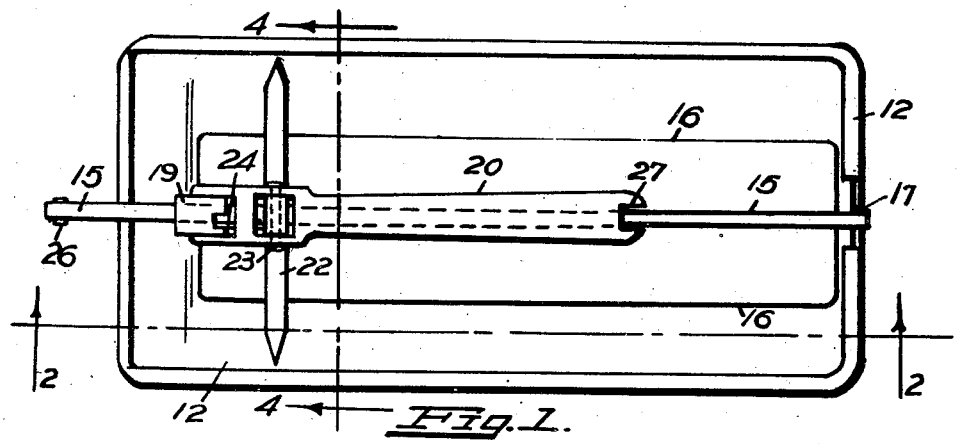
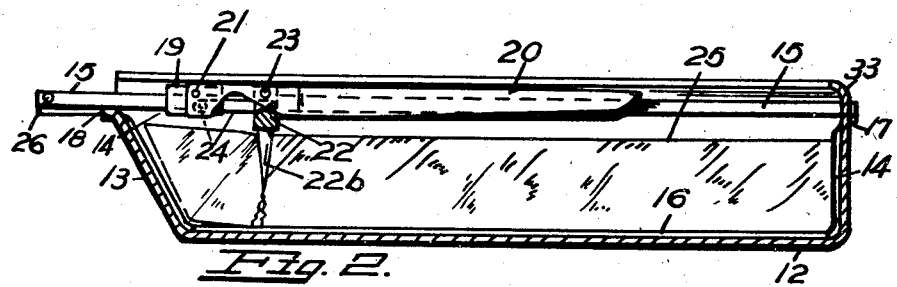
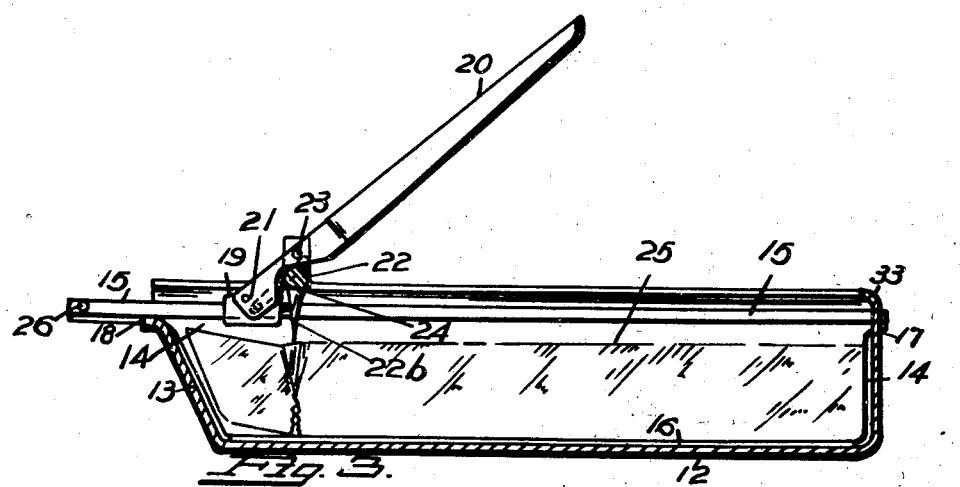

Patented Apr. 1, 1947

2,418,434

UNITED STATES PATENT OFFICE 2,418,434

METHOD AND MEANS OF HARVESTING ICE

Richard M. Storer, Denver, Colo.

Application July 8, 1939, Serial No. 283,383

42 Claims. (Cl. 62—111)

This invention relates to an improved method and means for harvesting ice from a tray or the like in which it is formed, and more particularly relates to the harvesting of ice from the containers of domestic mechanical refrigerators.

For some purposes, it is preferable to obtain ice in individual pieces of relatively substantial and irregular sizes, and for certain other purposes, it is preferable to use ice formed in relatively small pieces or chips.

In the common type of freezing grid for mechanical refrigeration, ice is formed in blocks or cubes of regular shape. These cubes of predetermined size frequently are not of optimum proportions for their conventional usage.

The present invention has been designed to provide ice in sizes and shapes best suited for the needs of domestic usage and it is a principal object of the invention to provide a method and means for harvesting ice from the container in irregularly shaped blocks or pieces of optional size.

Another object of the invention is the provision of a method and means for chipping or dividing ice or other frozen matter into relatively fine sizes in conjunction with its removal from the freezing container in which it is formed.

A further object of the invention is the provision of a method and mechanism for cutting the frozen contents of a freezing container in successive operations at automatically predetermined positions throughout the container.

Still another object of the invention is the provision of a cutting mechanism selectively operable to remove irregularly shaped blocks of ice from the container in sizes determined by the will of the operator.

A further object of the invention is the provision of cutter mechanism adapted for operation in association with a plurality of freezing containers.

Other objects reside in novel steps and treatments and novel combinations and arrangements of parts, all of which appear more fully in the course of the following description.

Heretofore in the art the harvesting of frozen matter from the freezing containers of domestic refrigerators has embodied the principle of freezing matter in adhering relation to a grid or other container dividing structure determining the size and shape of matter frozen in the container. Thereafter, some form of movement is imparted to such dividing structure which is calculated to disrupt the frozen matter from the tray and grid and thereby permit its removal by the user.

In contradistinction, the present invention utilizes the principle of cutting or dividing a body of frozen matter in the container to satisfy the individual requirements of the user with respect to the size and quantity of ice, and to this end, provision is made for cutting the body of ice at any selective position throughout the extent of the container.

Preferably, the operation involves a cutting element positioned exteriorly of the frozen body at the commencement of the disrupting action, and the penetration of the frozen contents by such cutting instrument under the influence of a mechanical force.

In such an action, a line of cleavage or fracture develops in the body along the line of penetration of the cutting instrument, and where the instrument is caused to penetrate the body to a substantial degree, such cleavage or fracture will extend from the uppermost to the lowermost limits of the body.

Further, by providing a mounting for the cutting instrument which permits its location at any selective position intermediate the ends of the body at the commencement of a given cutting operation, it is possible for the operator at his option to obtain chunks or fragments of the frozen contents of any desired size. Thus where the usage of the material requires a piece of substantial proportion, the cutter is moved from an end of the tray a substantial distance in determining the first cutting position, and if a quantity of the frozen contents is desired, similar movements of substantially the same degree from the end formed by the preceding cutting action will provide a number of blocks or pieces of relatively similar dimension.

Due to the structure of the ice, the cutting action will result in some chipping in conjunction with the main line of fracture and as a result, the pieces obtained by the cutting action are of more or less irregular shape.

This feature is of particular advantage where ice in fine sizes is desired, as the location of the cutting instrument in close proximity to the edge of the ice will result in the production of many pieces of fine size and irregular shape in each cutting movement.

To afford a better understanding of the invention, reference will now be made to the accompanying drawings illustrating apparatus embodying the present invention and adapted to perform the process hereinbefore described in the manner stated.

In the drawings, in the several views of which like parts have been designated similarly, Figure 1 is a plan view of apparatus built according to the present inventive concept;

Figure 2 is a longitudinal section taken along the line 2—2 of Figure 1;

Figure 3 is a longitudinal section taken along the line 2—2 of Figure 1 and showing an operating position of certain parts different from their positions as illustrated in Figure 2;

Figure 4 is a cross sectional view taken along the line 4—4 of Figure 1;

Figure 5 represents a modified detail;

Figure 6 is a cross sectional view taken along the line 6—6 of Figure 5;

Figures 7 and 8 are cross sectional illustrations of modified forms of the details shown in Figure 5;

Figure 9 is an end elevation of a modified arrangement; and

Figure 10 is a fragmentary sectional view drawn on an enlarged scale, illustrating certain optional modified details.

Referring first to the form of the invention illustrated in Figures 1, 2 and 3, the reference character 12 designates a freezing container or tray of the type adapted for use in the freezing compartment of a mechanical refrigerator, and preferably is provided with an inclined end as indicated at 13.

The harvesting mechanism of the present invention is mounted on a guide member 15 supported in this form of the invention on a wall or partition 14 having at its lower edge laterally projecting flanges 16 which rest upon the bottom of the tray 12.

In this form, the rail or guide member 15 and flanges 16 are all securely attached to the partition 14 for reasons that will be explained hereinafter. For convenience in placing the removable partition 14 in the desired position in tray 12, the upstanding ends of the tray may be provided with locking notches as indicated at 17 and 18.

An undercut slide member 19 is mounted for sliding movement along guide member 15, and an operating handle 20 is pivotally attached to the slide 19 at 21. A cutting element 22 is pivotally attached to the handle 20 at 23 and a pivotal link 24 connects the member 22 with the slide 19 on pivotal centers spaced a distance equal to the distance between the pivotal axes 21 and 23.

While the cutting element 22 may be of any suitable form, it has been illustrated in this form of the invention as a toothed member having a supporting back member 22a and a plurality of ice-engaging teeth or prongs 22b (Figure 4).

By reason of the mode of assembly described, the cutting element 22 may be moved up and down with reference to a body of ice 25 in the tray, and at all times will be held in a substantially vertical position and will move in a substantially straight line path since the slide 19 is maintained free for longitudinal movement along its guide 15.

If desired, a stop 26 may be provided adjacent an end of the guide member 15 to prevent movement of the slide across the end of the guide and within the limits of the guide member 15, the slide 19 and its associated mechanism are free to slide and to be located in any selective position therealong. Preferably, one end of the guide carries no stop so that the slide and associated mechanism may be removed therefrom and interchangeably mounted on the guides of other trays.

Since such usage will frequently result in the guide member becoming frosted to an extent that will interfere with the proper operation of the mechanism, notch 27 is provided in the handle 20 to permit the use of the handle in scraping the guide for the removal of foreign matter therefrom.

Figures 5 and 6 illustrate a modified form of the ice-cutting, -chipping, or -breaking member per se and Figures 7 and 8 illustrate in cross section corresponding to line 6—6 of Figure 5, other optional forms of the element 22.

Referring to Figure 9, a modified arrangement for supporting the rail or guide member 15 is illustrated wherein said rail or guide member 15 is mounted directly upon the upper edge of the tray 12 instead of being carried upon a partition member. In the construction shown in Figure 9, the rail or guide member 15 is securely attached to the upper edge of the tray 12. Obviously, the slide 19 and associated lever and mechanism may be slid onto the rail or guide member 15 and placed in operating position with reference to a body of ice in the tray 12.

Referring to Figure 10, the associated parts inclusive of tray 12, guide member 15, slide 19, handle 20 and cutting element 22 are intended to be the same or similar to the construction hereinabove set forth. In addition, a series of ratchet-like teeth 28 are provided along the upper surface of the guide 15 and a pawl 29 pivoted to the handle 20 at 30 is urged downwardly by a spring 31 and bears against a pin 32 on the slide 19. When the handle 20 is in its inoperative or horizontal position, as shown in Figure 10, the pawl 29 is held out of engagement with the teeth 28 by the pin 32 against which it bears.

When the handle 20 is moved upwardly about its pivotal connection 21, the pawl 29 is brought into engagement with one of the teeth 28 so that by continued arcuate movement of the handle 20, the entire operating assembly inclusive of the ice-cutting element 22 is advanced along the body of ice 25 in an automatic action to a predetermined position. This arrangement is particularly advantageous in cutting, chipping or breaking small pieces of ice from the main ice body to produce chipped ice of relatively fine sizes.

In any form of the invention, it is considered desirable that at least part of the upstanding edges of the tray 12 be turned slightly inwardly as shown at 33. Water or the liquid to be frozen is placed in the tray 12 and the inturned upper edges thereof tend to prevent spilling and slopping of the liquid from the tray during handling and placing of the tray in freezing proximity to a refrigerating device.

During freezing, the slide 19 and its associated mechanism preferably are positioned adjacent the inclined end 13 of the tray 12. After the liquid has been congealed into a body of ice, the tray is removed from the refrigerating device and the handle 20 may be moved arcuately about its pivotal axis 21 to bring the ice-cutting element 22 into and out of contact with the body of ice to separate pieces therefrom.

As pieces of ice are separated from the main body thereof, they are also loosened from their adherence to the walls of the trays and by virtue of the inclined end 13 of the tray, the pieces first loosened may slide upwardly and away from the main body of ice. When the handle 20 is raised, the entire operating mechanism may be slid along the rail or guide member 15 to selected positions whereupon the element 22 may be moved forcibly toward and penetrate into the body of ice to separate therefrom pieces of predetermined sizes.

If the movements of the slide 19 and its associated mechanism are small, then the ice removed will be in the form of small chips. If the movements of the slide 19 along its guide 15 are greater, then the pieces of ice separated from the main body thereof will be correspondingly larger. Since the slide 19 is free to move along its guide 15, the normal movement of the element 22 is straight line, this movement being effected by the link 24 as hereinabove set forth.

In the form of the invention illustrated in Figure 1, the flanges 16 being positioned below the body of ice 25 prevent the partition 14 and rail 15 from raising when the element 22 is forced toward and into the ice body.

As above pointed out, the slide 19 and its associated operating mechanism may be removed from one guide member 15 and placed into operating engagement with another guide member 15 on another tray 12, thus rendering the operating mechanism interchangeable with a plurality of trays.

When the arrangement as illustrated in Figure 10 and hereinabove described in detail, is used, the forward movement of the element 22 is automatically effected, the degree of forward movement being predetermined by the spacing of the teeth 20 and the position and proportions of the pawl 29 and its associated operating factors. Due to the ratchet-like nature of the teeth 28, each having a corresponding inclined surface, the entire operating mechanism may be manually moved toward the body of ice to a selected position at the option of the user even when the pawl 29 is in its engaged position with said teeth.

Therefore, it is apparent that in the form illustrated in Figure 10 the advance movement of the element along the ice body may be either automatic or selectively manual as preferred.

Obviously, the ratchet-like teeth could be used in connection with the form of the invention illustrated in Figure 9 wherein the rail or guide member 15 is mounted directly upon the upper edges of the tray 12. It is further apparent that any modified form of ice-cutting, -chipping, or -breaking element as herein illustrated or any equivalent thereof, can be used with any of the forms of the invention herein disclosed.

From the foregoing description, it will be apparent that the structural forms herein described and illustrated are well suited to practice the present invention, and it will be understood that changes and modifications may be availed of within the spirit and scope of the hereunto appended claims. In this connection, it will be understood that the particular structural forms and specific movements disclosed herein are merely illustrative of different methods of practicing the invention and so long as the body of ice frozen in the container is subjected to a cutting, breaking or chipping action through the penetrating influence of an element actuated by a mechanically directed force, the principle of the present invention will be satisfied.

What I claim and desire to secure by Letters Patent is:

1. In a method of harvesting ice or other frozen matter from a container in which it is formed, the improvement which comprises subjecting the frozen body so formed to the disruptive influence of a cutting instrument reacting against a portion of the container and penetrating a portion of the body through the application of a mechanically directed force.

2. In a method of harvesting ice or other frozen matter from a container, the improvement which comprises subjecting a body of frozen matter in the container to the disruptive influence of a cutting instrument positioned exteriorly of the body to react against a portion of the container and penetrating the body through the application of a mechanically directed force.

3. In a method of harvesting ice or other frozen matter from a container, the improvement which comprises subjecting a body of frozen matter in the container to the disruptive influence of a cutting instrument reacting against a portion of the container and penetrating a predetermined portion of the body through successive applications of a mechanically directed force.

4. In a method of harvesting ice or other frozen matter from a container, the improvement which comprises subjecting a body of frozen matter in the container to the disruptive influence of a cutting instrument reacting against a portion of the container and selectively penetrating portions of the body in successive actions through the application of a mechanically directed force.

5. The combination with a container for frozen matter, of a cutter mechanism, and means movably mounted on the container and arranged for selective cooperation therewith to cause penetration of the frozen contents thereof at predetermined positions.

6. The combination with a container for frozen matter, of a cutter element movably mounted on the container and normally positioned out of contact with the frozen contents thereof, and leverage mechanism arranged to cooperate with the cutter to cause penetration of frozen matter in the container.

7. The combination with a container for frozen matter, of a movable cutter element carried by the container, mechanism acting on the cutter to force its penetration of frozen matter in the container, and means associated with the mechanism to selectively determine successive operative positions of the cutter.

8. The combination with a tray for ice, of a guide member on the tray, an ice-cutting element slidably carried on the guide, and a lever positioned and adapted to force the cutting element into the ice at selected positions.

9. The combination with a tray for ice, of a guide member on the tray, an ice-cutting element slidably carried on the guide, a lever positioned and adapted to force the cutting element into the ice, and mechanism associated with the guide and the lever for advancing the element along the guide.

10. The combination with a container for frozen matter, of a supporting member on the container, an ice cutter mounted on the supporting member for lengthwise movement, and a lever acting on the cutter to force its penetration into frozen matter in the container.

11. In a method of harvesting ice or other frozen matter from a container in which it is formed, the improvement which comprises subjecting the frozen body within the container to the disruptive influence of a cutting instrument reacting against a portion of the container and penetrating successive portions of the frozen body through progressive applications of a mechanically directed force.

12. In a method of harvesting ice or other frozen matter from a container in which it is formed, the improvement which comprises subjecting the frozen body within the container to the disruptive influence of a cutting instrument reacting against a portion of the container and penetrating successive portions of the frozen body at measured intervals through applications of a mechanically directed force.

13. In a method of harvesting ice or other frozen matter from a container in which it is formed, the improvement which comprises subjecting the frozen body within the container to the disruptive influence of a cutting instrument reacting against a portion of the container and penetrating successive portions of the frozen body at uniform intervals through applications of a mechanically directed force.

14. The combination with a container for frozen matter, of a guide member thereon, an ice-cutter mounted for movement along the guide, and means positioned and adapted to force the cutter into frozen matter in the container.

15. As a new article of manufacture, a cutter-mechanism for freezing containers, comprising a carrier-member having means for its attachment to a support on which it moves, a cutter-member carried thereby, and means positioned to act on the cutter member and impart ice penetrating and retracting movements thereto.

16. As a new article of manufacture, a freezing container for domestic refrigerators, comprising a pan-member, and a rail-member affixed thereto and having means for supporting a movable cutter thereon, said rail member extending between the opposed upright walls of the pan-member.

17. In a device of the character described, the combination with a container for a frozen matter, of a guide-member extending between opposed walls of the container in the upper portion thereof, and means on the guide-member for attaching a movable cutter thereto.

18. The combination with a container for frozen matter, and a guide-member extending lengthwise of the container, of a cutter mechanism to act on the frozen matter, comprising a slide on the guide, a lever pivoted thereto, and a depending cutter on the lever.

19. The combination with a container for frozen matter, and a guide-member extending lengthwise of the container, of a cutter mechanism to act on the frozen matter, comprising a slide on the guide, a lever pivoted thereto, and a cutter pivotally mounted on the lever at a distance from the lever pivot.

20. The combination with a container for frozen matter, and a guide-member extending between opposed walls thereof at its top, of a cutter mechanism to act on the frozen matter, comprising a slide on the guide, a lever pivoted thereto, and a depending cutter on the lever.

21. The combination with a container for frozen matter, and a toothed guide-member extending between opposed walls thereof at its top, of a cutter mechanism to act on the frozen matter, comprising a slide on the guide, a lever pivoted thereto, a depending cutter on the lever, and a pawl connected with the lever for engaging the teeth of the guide during each actuation of the lever.

22. In a method of harvesting ice or other frozen matter from a container, the improvement which comprises subjecting a body of frozen matter in a container to the disruptive influence of a cutting instrument mounted for movement along the container to react against a portion thereof and penetrating portions of the body in successive actions through the application of a mechanically directed force.

23. The combination with a container for frozen matter, of a cutter mechanism, and means mounted on the container and arranged to cooperate therewith to cause penetration of the frozen contents thereof and arranged to move the mechanism along the container through a succession of cutting positions.

24. The combination with a container for frozen matter, of a cutter mechanism normally positioned out of contact with the frozen contents thereof, and means movably mounted on the container and arranged for selective cooperation therewith to cause penetration of the frozen contents thereof at predetermined positions.

25. The combination with a container for frozen matter, of a movable cutter element carried by the container, mechanism acting on the cutter to force its penetration of frozen matter in the container, and means associated with the mechanism for limiting the extent of cutter movement between successive cutting operations.

26. The combination with a container for frozen matter, of a cutter mounted for horizontal movement along the container, and mechanism arranged to cooperate with the cutter for driving the same into frozen matter within the container.

27. The combination with a container for frozen matter, of a cutter mounted for horizontal movement along the container, and mechanism arranged to cooperate with the cutter for driving the same in a substantially vertical direction into frozen matter within the container.

28. The combination with a container for frozen matter, of a cutter mounted for lengthwise movement along the container, and mechanism arranged to cooperate with the cutter for driving the same into frozen matter within the container.

29. As a new article of manufacture, a cutter-mechanism for freezing containers, comprising a carrier-member having means for its attachment to a support on which it moves, a cutter-member carried thereby, mechanism positioned to act on the carrier for imparting impelling movement thereto, and means arranged to act on the cutter-member and impart ice penetrating and retracting movements thereto.

30. In a device of the character described, the combination with a container for frozen matter, of a guide-member extending between opposed walls of the container in the upper portion thereof for the support of a movable cutter, and a rack disposed on the guide for engagement with a pawl carried by the cutter.

31. In refrigeration apparatus, structure including a receptacle for an ice block having a depth from one surface to an opposite surface in a range normally produced in a freezing compartment of a household refrigerator, an element arranged to be supported by said receptacle for subdividing the ice block, said element being movable from a position clear of the ice block toward and into the latter, said structure being so constructed and arranged that relative movement of the ice block and said element can be effected, said element being supported on said receptacle in such a manner that during its movement toward and into the ice block at the one surface it is always pointed toward the opposite surface so that said element will be capable, if desired, of causing a substantially clean fracture of the ice block from the one surface to the opposite surface, and said element due to said relative movement with the ice block being operable at different regions along said one surface of the ice block to fracture and subdivide the latter into smaller pieces.

32. An ice freezing tray and ice fracturing means movably supported on the tray and including ice-piercing elements movable into fracturing engagement with ice in the tray.

33. An ice freezing tray and a device outside of said tray in movable engagement therewith and operable to pierce and thereby fracture ice in said tray.

34. An ice freezing tray and a device in slidable engagement with the outside of said tray and operable to pierce and thereby fracture ice in said tray.

35. An ice freezing tray, a member slidably engageable with the outside of said tray, and ice piercing means mounted on said member.

36. An ice freezing tray, a member adapted for slidable engagement with the outside of said tray, a handle pivotally mounted on said member, and means operated by movement of said handle to fracture ice in said tray.

37. An ice freezing tray, a member overlying said tray and having its ends in slidable engagement with the exterior of said tray, and means carried by said member operable to pierce and thereby fracture ice in said tray.

38. An ice freezing tray, force multiplying mechanism operable to pierce and thereby fracture ice in said tray, and means for supporting said mechanism and movably engaging the exterior of said tray.

39. In a device of the character disclosed, the improvement which comprises a guideway, a slide movably carried on said guideway, a lever handle pivoted to said slide, ice-separating means pivoted to said lever handle, and means connected with said slide and said ice-separating means for holding said means in a substantially vertical position independently of the pivotal position of the lever handle.

40. The combination with an ice tray, of a wall member positioned in said tray, a series of rack-like teeth on said wall member, a lever handle slidably carried upon said wall member, a pawl pivoted to the lever handle in a position to engage said teeth, resilient means positioned for urging the pawl into such engagement, and an ice-separating element pivotally mounted on said lever handle.

41. The combination with an ice tray, of a wall member positioned in said tray, a series of rack-like teeth on said wall member, a bottom plate connected with said wall member, a pivotal lever handle slidably carried upon said wall member, a pawl pivoted to the lever handle in a position to engage said teeth, means positioned for urging the pawl into such engagement, and an ice-separating element pivotally mounted on said lever handle.

42. An ice freezing tray and ice fracturing means adapted to slidably engage said tray, said means being operable to pierce and thereby fracture ice in the tray.

RICHARD M. STORER.

REFERENCES CITED

The following references are of record in the file of this patent:

UNITED STATES PATENTS

| Number | Name | Date |
| --- | --- | --- |
| 475,518 | Richard | May 24, 1892 |
| 1,305,711 | Gilchrist | June 3, 1919 |
| 1,930,056 | Klingler | Oct. 10, 1933 |
| 1,992,645 | Wilkins | Feb. 26, 1935 |
| 2,061,265 | Yoemans | Nov. 17, 1936 |
| 2,070,097 | Stipe | Feb. 9, 1937 |
| 2,072,601 | Miner | Mar. 2, 1937 |
| 2,093,856 | Wales | Sept. 21, 1937 |